Nov. 26, 1946.  J. H. LESLIE, 2D  2,411,577
PRESSURE RESPONSIVE MICRO-SWITCH
Filed Dec. 3, 1943
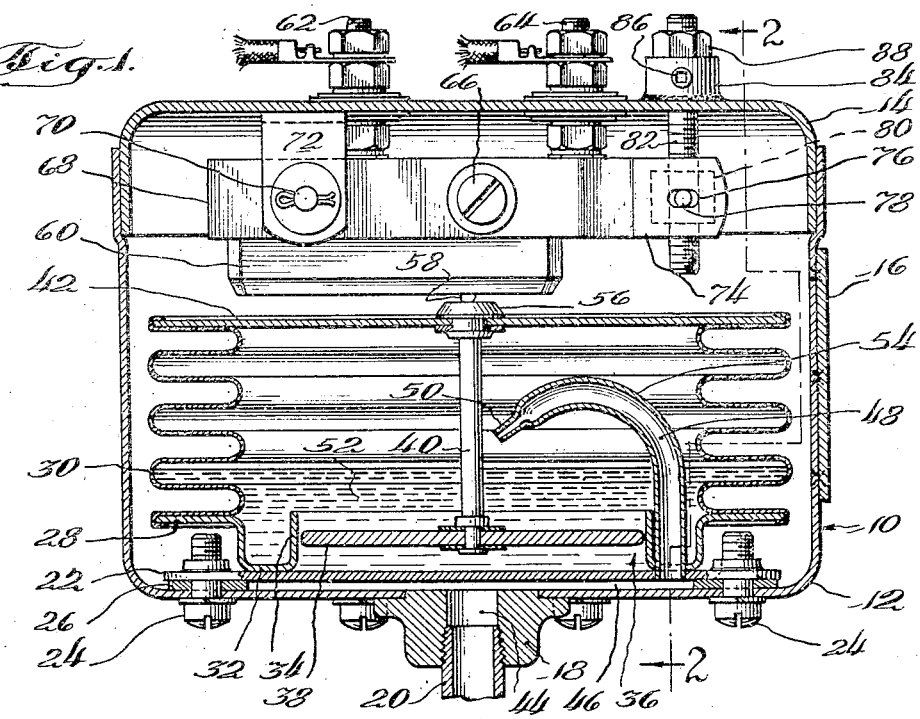
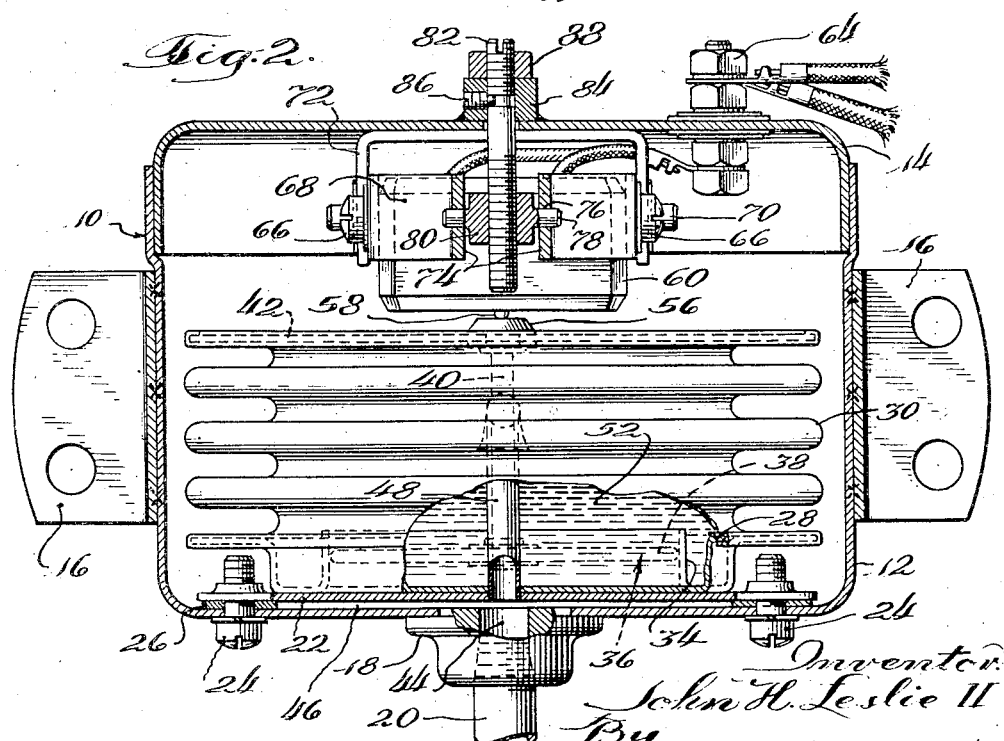
Inventor
John H. Leslie II
By Williams, Bradbury & Hinkle
Attorneys Patented Nov. 26, 1946

2,411,577

UNITED STATES PATENT OFFICE 2,411,577

PRESSURE RESPONSIVE MICROSWITCH

John H. Leslie, II, Winnetka, Ill., assignor to Stewart-Warner Corporation, Chicago, Ill., a corporation of Virginia Application December 3, 1943, Serial No. 512,792

8 Claims. (Cl. 200—83)

My invention relates to pressure responsive micro-switches and more particularly to a pressure responsive micro-switch particularly adapted for use in connection with internal combustion heaters installed on aircraft.

In modern aircraft practice, it is common to provide an aircraft with one or more internal combustion heaters and to supply such heaters with ventilating and combustion air by means of rams located at suitable places to deliver air to the heater when the aircraft is in normal flight. Since such rams are dependent upon forward motion of the aircraft to produce the necessary air flow to the heater, it is desirable and usual to provide a pressure responsive switch which will cut off the supply of fuel to the heater when the ventilating air ram is incapable of delivering sufficient ventilating air to the heater installation. Because of the extremely slight pressure variations to which such a pressure responsive switch must respond, the known types of switches are adversely affected by the vibration accompanying aircraft operation and are not entirely satisfactory.

An object of my invention is to provide a new and improved pressure responsive switch which is sensitive to extremely slight variations in fluid pressure, but which is not adversely affected by vibration.

Another object of my invention is to provide a new and improved pressure responsive switch having a dashpot for rendering the switch mechanism immune to vibration.

Another object of my invention is to provide a new and improved pressure responsive micro-switch which may be carried in any position prior to installation on an aircraft and which is so designed that the dashpot fluid will not escape when the switch is placed in an inverted or otherwise abnormal position.

Another object of my invention is to provide a new and improved pressure responsive micro-switch which is of simple and inexpensive construction, compact, light weight and durable.

Other objects and advantages will become apparent as the description proceeds.

In the drawing:

Fig. 1 is a sectional view through a switch embodying a preferred form of my invention; and Fig. 2 is an irregular, transverse, sectional view taken on the line 2—2 of Fig. 1.

My invention is illustrated in the drawing as being incorporated in a pressure responsive micro-switch, comprising a sheet metal housing, indicated generally by reference character 10 and comprising a cup-shaped sheet metal base 12 and an inverted cup-shaped cover 14 fixedly secured to the base in any suitable manner.

A pair of sheet metal brackets 16 are welded to the side walls of the base 12 and constitute convenient means for securing the switch to any suitable support. A short tubular member 18 is secured in an opening located centrally of the base 12 and is threaded to receive one end of a pipe 20 serving to connect the interior of the housing 10 with the interior of a ventilating air duct in the manner illustrated and described in my co-pending application, Serial No. 513,732, filed December 10, 1943.

A sheet metal plate 22 is secured to the base 12 by screws 24 and is spaced from the bottom of this base by an annulus 26. The end member 28 of a sheet metal bellows or Sylphon 30 has an annular portion 32 secured to the plate 22 by welding, or in any other manner suitable to form a fluid tight seal therebetween. The inner portion 34 of the end member 28 is bent upwardly to form a dashpot cylinder, indicated generally by reference character 36. A dashpot piston 38 is located in the cylinder 36 and is attached to the lower end of a pin 40 whose upper end is attached to the upper end member 42 of the Sylphon 30.

Fluid pressure in the ventilating air duct is transmitted to the interior of the Sylphon 30 by way of pipe 20, bore 44, space 46 formed between base 12 and plate 22, and tube 48 whose lower end is secured in aligned openings provided in the plate 22 and annular portion 32 of end member 28. When the switch mechanism is in the normal position shown in the drawing, the upper end 50 of this tube is located well above the level of the hydraulic fluid 52 which fills the dashpot cylinders 36 and the lower portions of the Sylphon 30.

The upper portion 54 of the tube 48 is curved, as clearly shown in Fig. 1, so that for every position of the housing, the end 50 will be located above the level assumed by the hydraulic fluid. The upper end 50 of this tube is of reduced diameter to prevent any hydraulic fluid from splashing into this tube when the housing is suddenly inverted or subjected to a rapid change in position.

The extreme upper end of the pin 40 constitutes a button 56 which engages the pin 58 of a micro-switch 60, which is biased toward open position and which is closed whenever sufficient pressure exists in the Sylphon 30 to insure a proper flow of ventilating air to the heater.

The micro-switch 60 may be of any usual or suitable construction and controls a circuit including the terminals 62 and 64 mounted in the cover 14 of the housing 10.

The micro-switch 60 is attached by screws 66, or any other suitable means, to a frame 68 pivotally mounted on a pin 70 carried in the ends of a U-shaped bracket 72 attached to the cover 14 by welding, or in any other suitable manner. The frame 68 is provided with inwardly bent ends 74 having slots 76 pivotally receiving the oppositely extending pins 78 of a nut 80 threadedly engaging a screw 82. This screw 82 is freely rotatable in a bushing 84 secured in the cover 14 and this bushing is provided with a set screw 86 extending into an annular groove in the adjusting screw 82 to prevent longitudinal movement of this screw relative to the cover 14. A lock nut 88 is preferably provided to hold the adjusting screw 82 in adjusted position and to prevent accidental displacement thereof by the vibration resulting from aircraft operation.

The Sylphon 30 is made of such size and construction that it readily responds to the slight pressure change which represents the difference between insufficient and sufficient ventilating air flow to the heater and the adjusting screw 82 is set so that the micro-switch 60 responds to the elongation and shortening of the Sylphon 30 resulting from such critical changes in the pressure therein. The dashpot piston 38 attached to the upper or free end of the Sylphon 30 fits the dashpot cylinder 36 closely enough so that the position of the upper end of the diaphragm is not affected by vibrations, but is permitted to respond to pressure changes created in the interior of this Sylphon and continuing for an appreciable length of time. It will be understood that the housing 10 is not air tight and that the pressure in the space surrounding the Sylphon 30 changes with changes in atmospheric pressure, so that the pressure differential between the interior and exterior of the Sylphon 30 represents the pressure differential between the pressure created by the ventilating air ram and atmospheric pressure.

While I have described my invention as being utilized to control the flow of fuel to an aircraft heater in response to variations in pressure created by the ventilating air ram of such heater, my invention is not limited to such use but may be utilized for other purposes. It is also to be understood that my invention is not limited to the particular details illustrated and described, but may assume numerous other forms and that my invention includes all variations, modifications and equivalents coming within the following claims.

I claim:

1. A pressure responsive switch of the class described, comprising a housing, a Sylphon in said housing exposed to variable differences in pressure, a micro-switch mounted in said housing and controlled by said Sylphon, said Sylphon having a part forming a dashpot cylinder and constituting a container for hydraulic fluid for said dashpot cylinder, and a dashpot piston mounted in said cylinder attached to the switch control part of said Sylphon.

2. A pressure responsive switch of the class described, comprising a sheet metal housing, a Sylphon having one end secured to said housing, an electric switch mounted in said housing, said Sylphon having a free end controlling said switch, said fixed end of said Sylphon forming a dashpot cylinder and serving as a container for hydraulic fluid therefor, a piston mounted in said dashpot cylinder and connected to the free end of said Sylphon, and a pressure transmitting tube extending into said Sylphon and having an inner end located above said hydraulic fluid in all positions of said housing.

3. A pressure responsive switch of the class described, comprising a Sylphon having a fixed base and a movable end, said fixed base forming a dashpot cylinder, a dashpot piston located in said cylinder and secured to said free end, means for creating a pressure differential between the interior and exterior of said Sylphon, and control means responsive to expansion and contraction of said Sylphon.

4. A pressure responsive switch of the class described, comprising a housing having a cup shaped base, a plate secured in the bottom of said base and having a part spaced therefrom to form a passage therebetween, means connecting said passage with a source of pressure variations, a Sylphon having one end provided with a reversely bent, annular portion secured to said plate and cooperating therewith to form a dashpot cylinder, said Sylphon having a free end, a pin carried by said free end and providing a switch engaging button, a dashpot piston mounted on said pin and located in said cylinder, a curved tube rigid with said fixed end and connecting said passage with the interior of said Sylphon, hydraulic fluid in said cylinder, said tube having a restricted inner end located above said fluid for all positions of said housing, a frame pivotally secured to said housing, a micro-switch carried by said frame and having a pin engaged by said button, and means for adjusting said frame about said pivot.

5. A pressure responsive switch of the class described, comprising a housing, a plate secured to said housing and having a part spaced therefrom to form a passage therebetween, means connecting said passage with a source of pressure variations, a Sylphon having one end provided with a reversely bent, annular portion secured to said plate and cooperating therewith to form a dashpot cylinder, said Sylphon having a free end, a pin carried by said free end, a dashpot piston mounted on said pin and located in said cylinder, a curved tube rigid with said fixed end and connecting said passage with the interior of said Sylphon, hydraulic fluid in said cylinder, said tube having a restricted inner end located above said fluid for all positions of said housing, a frame pivotally secured to said housing, a switch carried by said frame and having a part engaged by said free end, and means for adjusting said frame about said pivot.

6. A pressure responsive switch of the class described, comprising a housing, a Sylphon secured to said housing and having one end provided with a reversely bent, annular portion forming a dashpot cylinder, said Sylphon having a free end for engaging a control switch, a dashpot piston located in said cylinder and connected to said free end, a curved tube connecting a source of variable pressure with the interior of said Sylphon hydraulic fluid in said cylinder, said tube having a restricted inner end located above said fluid for all positions of said housing, a frame pivotally secured to said housing, a micro-switch carried by said frame and having a pin engaged by said button, and means for adjusting said frame about said pivot.

7. A pressure responsive switch of the class described, comprising a housing having a cup shaped base, a plate secured in the bottom of said base and having a part spaced therefrom to form a passage therebetween, means connecting said passage with a source of pressure variations, a bellows having one end provided with a reversely bent, annular portion secured to said plate and cooperating therewith to form a dashpot cylinder, said bellows having a free end, a pin carried by said free end and providing a switch engaging button, a dashpot piston mounted on said pin and located in said cylinder, a tube rigid with said fixed end and connecting said passage with the interior of said bellows, hydraulic fluid in said cylinder, said tube having a restricted inner end located above said fluid for all positions of said housing, a frame secured to said housing, and a micro-switch carried by said frame and having a pin engaged by said button.

3. A pressure responsive switch of the class described comprising a housing having a cup shaped base, a plate secured in the bottom of said base and having a part spaced therefrom to form a passage therebetween, means connecting said passage with a source of pressure variations, a Sylphon having one end secured to said plate and cooperating therewith to form a dashpot cylinder, said Sylphon having a free end, a pin carried by said free end and providing a switch engaging button, a dashpot piston mounted on said pin and located in said cylinder, a curved tube rigid with said fixed end and connecting said passage with the interior of said Sylphon, hydraulic fluid in said cylinder, said tube having an inner end located above said fluid for all positions of said housing, a frame pivotally secured to said housing, a micro-switch carried by said frame and having a pin engaged by said button, and means for adjusting said frame about said pivot.

JOHN H. LESLIE, II.